United States Patent [19]

Ammon

[11] Patent Number: 5,548,536
[45] Date of Patent: Aug. 20, 1996

[54] METHOD FOR DETERMINING QUANTITIES WHICH CHARACTERIZE THE DRIVING BEHAVIOR

[75] Inventor: Dieter Ammon, Stuttgart, Germany

[73] Assignee: Daimler-Benz Ag, Stuttgart, Germany

[21] Appl. No.: 322,530

[22] Filed: Oct. 17, 1994

Related U.S. Application Data

[63] Continuation-in-part of Ser. No. 60,548, May 13, 1993, abandoned.

[30] Foreign Application Priority Data

May 16, 1992 [DE] Germany ............................ 42 16 301.3

[51] Int. Cl.⁶ .................................................. G06F 17/00
[52] U.S. Cl. ........................................ 364/565; 364/424.05
[58] Field of Search .................................. 364/141, 142, 364/424.01, 424.05, 424.03, 426.02, 565, 737, 183

[56] References Cited

U.S. PATENT DOCUMENTS

| | | | |
|---|---|---|---|
| 4,412,594 | 11/1983 | Furukawa et al. | 180/140 |
| 4,964,481 | 10/1990 | Sano et al. | 180/140 |
| 5,208,751 | 5/1993 | Berkefeld | 364/424.05 |
| 5,386,365 | 1/1995 | Nagaoka | 364/424.05 |
| 5,388,626 | 2/1995 | Asano et al. | 152/454 |

FOREIGN PATENT DOCUMENTS

| | | |
|---|---|---|
| 3642049 | 6/1987 | Germany. |
| 3608420 | 11/1991 | Germany. |
| 4132276 | 4/1992 | Germany. |
| 2257551 | 1/1993 | United Kingdom. |

OTHER PUBLICATIONS

Zomotor, Adam: Fahrwerktechnik, Fahrverhalten, (Chassis technology driving behavior), Vogel 1987, IBN 3–8023–0774–7, pp. 99–116.

*Primary Examiner*—Ellis B. Ramirez
*Assistant Examiner*—Craig Steven Miller
*Attorney, Agent, or Firm*—Evenson, McKeown, Edwards & Lenahan

[57] ABSTRACT

The invention relates to a method for determining quantities which characterize driving behavior. Signals indicative of steering angle, longitudinal speed of the vehicle, and two transverse accelerations located one behind the other in the longitudinal direction of the vehicle, are fed to a computing device. The measured quantities are used to derive further quantities in the computing device using vehicle-specific quantities and a vehicle model. Furthermore, at least one of the further quantities is the sideslip angle or the yaw-angle velocity which are determined and output by the computing device.

20 Claims, 2 Drawing Sheets

5,548,536

METHOD FOR DETERMINING QUANTITIES WHICH CHARACTERIZE THE DRIVING BEHAVIOR

RELATED APPLICATIONS

This application is a continuation-in-part of U.S. application Ser. No. 08/060,548, filed May 13, 1993, and now abandoned.

BACKGROUND AND SUMMARY OF THE INVENTION

The invention relates to a method for determining quantities which characterize driving behavior using a computing device which is provided with signals indicative of steering angle, longitudinal speed of the vehicle, and two transverse accelerations, located one behind the other in the longitudinal direction of the vehicle.

A method which uses the Sagnac effect to determine yaw-angle velocity is known. In this method, monochromatic coherent light is split and guided in opposite directions on a circular path by means of light-guide cables. As a result of a rotation (yawing movement) of the light-guide cables, a rotating reference system is obtained for the split light. Since electromagnetic waves behave differently in a rotating reference system than in a stationary reference system (in conformity with the relativistic transformation equations), the interference phenomena of the split light also changes in dependence on the rotational acceleration (yaw-angle acceleration) and rotational speed (yaw-angle velocity). By evaluating these interference phenomena, the corresponding quantities of rotational movement can be determined.

A disadvantage of this method is that a light source with light capable of providing measurable interference must be provided. Moreover, the arrangement requires that the light-guide cables be mounted in such a way so as to minimize vibrations, which adversely affect interference measurements.

A linear single-track model of a vehicle is known, wherein the height of the center of gravity of the vehicle is unimportant. Thus, the center of gravity of the vehicle is shifted into the plane of the tread contact points of the wheels. Since rolling and pitching movements are thus minimized, the wheels can be modeled as one wheel in the middle of the axle. This model is described by way of example in the German Book: Zomotor, Adam: Fahrwerktechnik, Fahrverhalten, (Chassis technology, driving behavior), publisher J örnsen Reimpell, Würzburg: Vogel 1987, ISBN 3-8023-0774-7 on pages 99 to 116. This reference does not disclose how the yaw-angle velocity and the yaw-angle acceleration can be derived from measurable quantities.

A method for determining the sideslip angle by using the yaw-angle velocity as a measurement quantity is known from German Patent specification 3,608,420. There, a sideslip angle of the vehicle is calculated by using a vehicle model and from the measurement quantities of the longitudinal speed of the vehicle, the steering-wheel angle, two transverse accelerations of the vehicle which are located one behind the other in the longitudinal direction of the vehicle, and the yaw-angle of velocity.

An object of the present invention is to design a method for determining quantities which characterize driving behavior such that as high a measuring accuracy as possible is achieved, along with as low a cost as possible.

This and other objects are, according to certain embodiments of the invention, achieved by using a computing device which is fed signals representing measured quantities of the steering angle, the longitudinal speed of a vehicle that has tires, and two transverse accelerations located one behind the other in the longitudinal direction of the vehicle, deriving further quantities using vehicle-specific quantities and a vehicle model, determining yaw-angle velocity using measured and derived quantities along with the vehicle model, wherein the vehicle model takes into account the transverse force buildup at the tires of the vehicle. The yaw-angle velocity is outputted to a vehicle control device which influences the driving behavior of the vehicle as a function of the yaw-angle velocity.

In certain preferred embodiments of the present invention, the yaw-angle velocity is independent of the driving state. In other preferred embodiments of the present invention, the sideslip angle is determined and output. Rolling movements of the vehicle can be factored into the determination of quantities and the transverse acceleration can be measured by means of transverse acceleration sensors having respective installation heights which are identical and correspond to a height of a center of gravity. The calculated quantities can be adapted according to vehicle type and the method of adaptation can employ a sliding average.

Other objects, advantages and novel features of the present invention will become apparent from the following detailed description of the invention when considered in conjunction with the accompanying drawings.

DETAILED DESCRIPTION OF THE DRAWINGS

Figure 1:
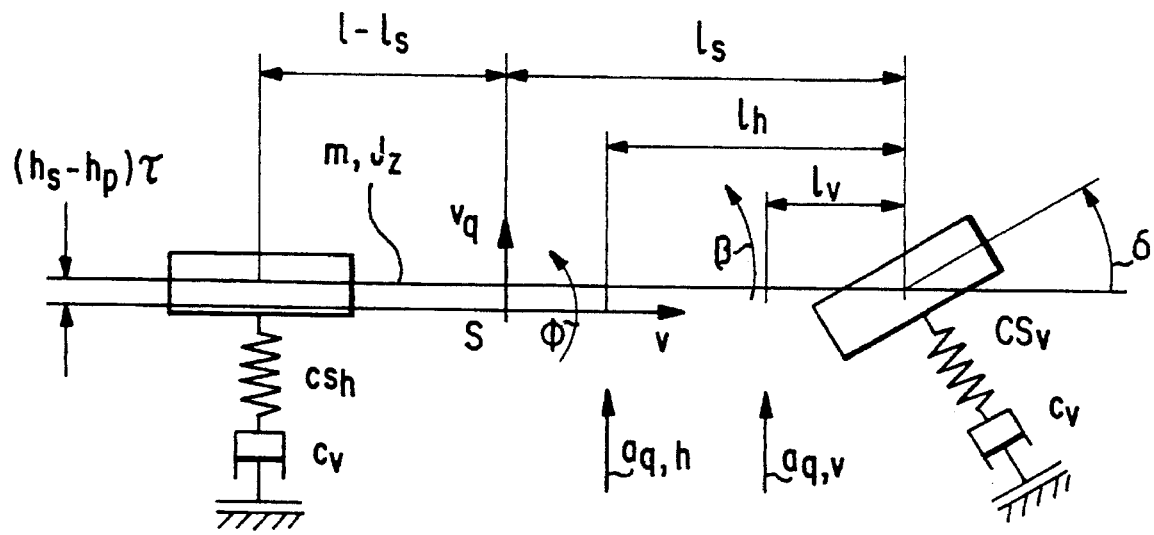
FIG. 1 shows representations of various quantities of a vehicle according to an embodiment of the present invention.

Some equations, by means of which the quantities to be determined are represented in dependence on measurable quantities, are first to be derived. For this purpose, a table illustrating the meaning of the symbols used hereafter is set forth below.

| Symbol | Meaning |
|---|---|
| $d\#/dt$ | First derivative of a quantity #, which is one of the quantities contained in this table |
| $d^2\#/dt^2$ | Second derivative of a quantity # of which is one of the quantities contained in this table |
| a | Longitudinal acceleration of the vehicle |
| $a_q$ | Transverse acceleration of the vehicle |
| $a_{qh}$ | Transverse acceleration of the vehicle, rear |
| $a_{qv}$ | Transverse acceleration of the vehicle, front |
| $c_h$ | Cornering stiffness, rear |
| $c_v$ | Cornering stiffness, front |

-continued

| Symbol | Meaning |
|---|---|
| $cs_h$ | Transverse spring rigidity, rear |
| $cs_v$ | Transverse spring rigidity, front |
| $c_x$ | Torsion spring rigidity during rolling about longitudinal axis of vehicle |
| $h_h$ | Installation height of transverse-acceleration sensor, rear |
| $h_p$ | Rolling-pole height (distance between the point of fixed location and the ground during a rolling movement) |
| $h_s$ | Height of center of gravity |
| $h_v$ | Installation height of transverse-acceleration sensor, front |
| $J_x$ | Moment of inertia about the longitudinal axis of the vehicle |
| $J_z$ | Moment of inertia about the vertical axis of the vehicle |
| $k_x$ | Rotational damping during a rolling movement along the longitudinal axis of the vehicle |
| $l$ | Wheelbase |
| $l_h$ | Distance between transverse-acceleration sensor, rear, and front axle |
| $l_v$ | Distance between transverse-acceleration sensor, front, and front axle |
| $l_s$ | Distance between center of gravity and front axle |
| $m$ | Vehicle mass |
| $S_h$ | Lateral force on the rear wheels |
| $S_v$ | Lateral force on the front wheels |
| $v$ | Longitudinal speed of the vehicle |
| $\alpha_h$ | Slip angle on rear axle |
| $\alpha_v$ | Slip angle on front axle |
| $\beta$ | Sideslip angle |
| $\delta$ | Wheel steering angle |
| $\delta t$ | Integration step size |
| $\Phi$ | Yaw angle |
| $\tau$ | Roll angle |

The force balance in the transverse direction of the vehicle gives the equation:

$$m * a_g = S_v * \cos(\delta) + S_h \quad (1)$$

The moment balance about the vertical axis of the vehicle gives the relation:

$$J_z * d^2\Phi/dt^2 = l_s * S_v \cos(\delta) - (l - l_s) * S_h \quad (2)$$

Moreover, the dynamics of a rolling movement, modelled by the formulation of a differential equation of the second order, becomes:

$$J_x * d^2\tau/dt^2 + k_x * d\tau/dt + c_x * \tau = m*(h_s - h_p) * a_q \quad (3)$$

The transverse-force build-up on the tires may be defined as the potential energy build-up in the tires of the vehicle caused by a time lag between the time the tires are turned and when the turn is felt due to the deformation of the tires. A modelling of this transverse-force build-up on the tires is carried out according to the following equations:

$$\frac{dS_v/dt}{cs_v} + \frac{v}{c_v} * S_v = \frac{1}{\cos(\delta)} * \alpha_v \quad (4)$$

$$\frac{dS_h/dt}{cs_h} + \frac{v}{c_h} * S_h = * \alpha_h \quad (5)$$

$$\alpha_v = v*\sin(\delta) - l_s*d\Phi/dt - v_q - (h_s - h_v)*d\tau/dt \quad (6)$$
$$\alpha_h = (l - l_s)*d\Phi/dt - v_q - (h_s - h_h)*d\tau/dt \quad (7)$$

These equations describing the transverse-force build-up have a high dependence on the longitudinal speed of the vehicle v.

The accelerations $a_q$ and a depend on the change in time in the amount of the respective speed and on the change in time in the direction of the respective speed. The following equations are thus obtained:

$$a_q = dv_q/dt + v*d\Phi/dt \quad (8)$$

$$a = dv/dt - v_q*d\Phi/dt \quad (9)$$

The steering angle $\delta$, the longitudinal speed of the vehicle v and two transverse accelerations $a_{qv}$ and $a_{qh}$ will now be used as measurement quantities. The two transverse-acceleration sensors can each be described by the distance from the front axle and by the respective height. In view of the geometry, the following is obtained for these two acceleration sensors:

$$a_{qv} = a_q + (l_s - l_v)*d^2\Phi/dt^2 + (h_s - h_v)* d^2\tau/dt^2 \quad (10)$$

$$a_{qh} = a_q + (l_s - l_h)*d^2\Phi/dt^2 + (h_s - h_h)* d^2\tau/dt^2 \quad (11)$$

Since the equations (10) and (11) relate to a system of two equations which are linearly independent in that $l_h$ is unequal to $l_v$, consequently, with a known or negligible rolling acceleration $d^2\tau/dt^2$, the yaw-angle acceleration $d^2\Phi/dt^2$ and the transverse acceleration of the vehicle can be determined. Combining the two equations (10) and (11) produces:

$$a_q = \frac{(l_s - l_h)*(a_{qv} - (h_s - h_v)*d^2\tau/dt^2) - (l_s - l_v)*(a_{qh} - (h_s - h_h)*d^2\tau/dt^2)}{(l_v - l_h)} \quad (12)$$

$$d^2\Phi/dt^2 = \frac{a_{qv} - a_{qh} + (h_v - h_h)*d^2\tau/dt^2}{(l_v - l_h)} \quad (13)$$

Advantageously, when the transverse-acceleration sensors are mounted, provision can be made for ensuring that $h_v = h_h = h_p$. This cancels the rolling-acceleration terms, irrespective of the order of magnitude of the rolling acceleration, with the result that the evaluation is simplified considerably.

Alternatively, the rolling dynamics can be obtained by means of a numerical evaluation, known per se, of the differential equation (3), for example by means of the Runge-Kutta method or by means of the explicit Euler method with the integration step size $\delta t$:

$$d^2\tau/dt^2 = \frac{-k_x*d\tau/dt - c_x*\tau + m*(h_s - h_p)*a_q}{J_x} \quad (14)$$

$$\tau_{new} = \tau + d\tau/dt*\delta t; \quad d\tau/dt_{new} = d\tau/dt + d^2\tau/dt^2*\delta t \quad (15)$$

The yaw-angle and transverse accelerations and the rolling quantities can thus be determined by using the equations (12), (13), (14) and (15) or by estimations of state by means of the equations (3), (10) and (11).

The lateral forces can be obtained from the force balance according to equation (1) and from the moment balance according to equation (2):

$$S_v = \frac{(l-l_s)*m*a_q + J_z * d^2\Phi/dt^2}{l*\cos(\delta)} \tag{16}$$

$$S_h = \frac{l_s*m*a_q - J_z d^2\Phi/dt^2}{l} \tag{17}$$

Differentiation of the two equations (16) and (17) thus produces:

$$dS_v/dt = \frac{(l-l_s)*m*da_q/dt + J_z*d(d^2\Phi/dt^2)/dt}{l*\cos(\delta)} - \tag{18}$$

$$\frac{\sin(\delta) * ((l-l_s)*m*a_q + J_z*d^2\Phi/dt^2) * d\delta/dt}{l*\cos^2(\delta)}$$

$$dS_h/dt = \frac{l_s*m*da_q/dt - J_z d^2\Phi/dt^2}{l} \tag{19}$$

Equations (4), (5), (6) and (7) thus produce two linear equations, by means of which the quantities $v_q$ and $d\Phi/dt$ can be determined from known quantities.

$$l_s*d\Phi/dt + v_q = -\left(\frac{dS_v/dt}{cs_v} + \frac{v}{c_v}*S_v\right)*\cos(\delta) + \tag{20}$$

$$v*\sin(\delta) - (h_s - h_p)*d\tau/dt$$

$$-(l-l_s)*d\Phi/dt + v_q = -\left(\frac{dS_h/dt}{cs_h} + \frac{v}{c_h}*S_h\right) - (h_s - h_p)*d\tau/dt \tag{21}$$

The equations (16), (17), (18) and (19) contain only quantities which are measured directly ($\delta$, v, $a_{gh}$, $a_{qv}$) or, as described above, can be determined by means of the measured quantities. Time derivations of known quantities can be derived by quotient formation. The quantities $v_g$ and $d\Phi/dt$ can thus be calculated at any time. The sideslip angle $\beta$ is obtained by the equation:

$$\beta = \arctan(v_q/v) \tag{22}$$

It was previously described how quantities which characterize the driving behavior are determined from known parameters relating to the vehicle. These parameters sometimes fluctuate. The vehicle mass and the position of the center of gravity vary as a result of different loads. The tire-dependent quantities vary with the tire temperature and with different road surfaces. An important fluctuation is the cornering stiffness. A method by which an adaptation of the cornering stiffness is possible will be presented below. An adaptation of the other parameters can then likewise take place.

Initially, for this adaptation, it is necessary to find system equations which contain only known or derivable quantities and which are linearly independent as the equations used to determine the known or derived quantities. Suitable equations are obtained, for example, by differentiating the equations (20) and (21).

$$c_v \equiv C_v(t) = (S_v * \cos(\delta) * dv/dt + v * \cos(\delta) * dS_v/dt + \tag{23}$$

$$v * S_v * \sin(\delta) * d\delta/dt) * f_v(t)$$

$$\frac{1}{f_v(t)} = -l_s*d^2\Phi/dt^2 - a_q + v*d\Phi/dt + \sin(\delta)*dv/dt - \tag{24}$$

$$v*\cos(\delta)*d\delta/dt - \frac{\cos(\delta)*d^2S_v/dt^2 + \sin(\delta)*dS_v/dt*d\delta/dt}{cs_v} -$$

$$(h_s - h_p)*d^2\tau/dt^2$$

$$c_h \equiv c_h(t) = (S_h*dv/dt + v*dS_h/dt) * f_h(t) \tag{25}$$

$$\frac{1}{f_h(t)} = (l-l_s)*d^2\Phi/dt^2 - a_q + v*d\Phi/dt - \tag{26}$$

$$\frac{d^2S_h/dt^2}{cs_h} - (h_s - h_p)*d^2\tau/dt^2$$

The yaw-angle velocity is obtained from the equations (20) and (21) by the elimination of $v_q$. The lateral forces are calculated by means of the equations (16), (17), (18) and (19) and corresponding difference quotients. Actual estimated values are thus obtained for the cornering stiffness at the front and at the rear respectively. An updating of the values of the cornering stiffness which are used in the further calculations can be carried out by $L_2$, approximation with sliding time averaging. The parameters to be used in the following calculations are designated by $c_{v,act}$ and $C_{h,act}$. The previous parameters are designated by $c_v$ and by $c_h$. The actual estimated values are designated by $C_v(t)$ and by $C_h(t)$.

$$C_{v,act} = (l-\Gamma)*c_v + \Gamma*C_v(t) \tag{27}$$

$$C_{h,act} = (l-\Gamma)*c_h\Gamma*C_h(t) \tag{28}$$

In these, $\Gamma$ is a factor having a value of between 0 and 1. The larger $\Gamma$ is, the more the actual estimated values are taken into account. At a small value of $\Gamma$, a slow adaptation takes place. If the adaptation is to take place, for example, at a critical frequency $\Omega_G$, then $\Gamma=\Omega_G*\delta t$ is true.

Figure 2:
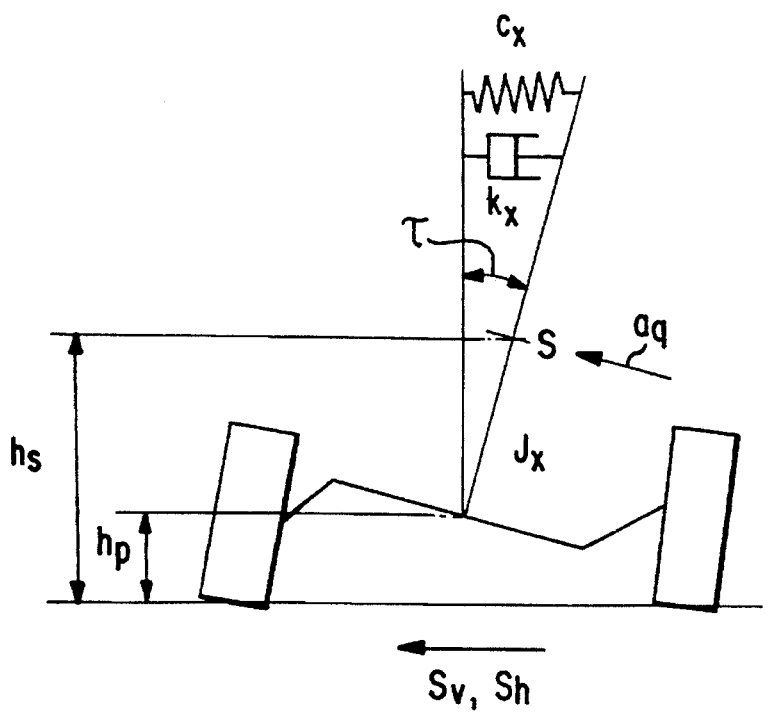
FIG. 2 shows representations of various quantities of a vehicle according to an embodiment of the present invention.
Figure 3:
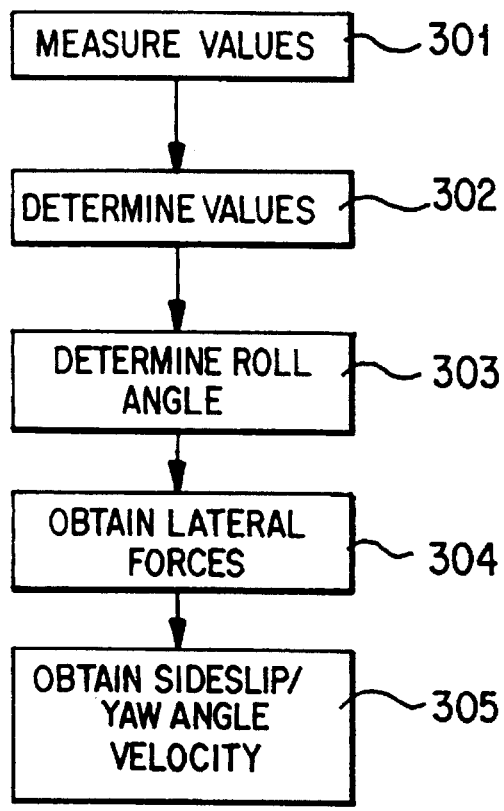
FIG. 3 is a flow chart illustrating a method according to an exemplary embodiment of the invention.

An exemplary embodiment of the invention is illustrated diagrammatically in the drawing and is described in more detail below. Representations showing the quantities according to the above table on a vehicle are to be taken from FIGS. 1 and 2. FIG. 3 shows a possible flow of the method according to the invention.

A first step 301 measures the values, on the basis of which the quantities characterizing the driving behavior are determined. These values are the steering angle $\delta$, the longitudinal speed of the vehicle v and the two transverse accelerations $a_{qv}$ and $a_{qh}$. The steering angle $\delta$ is preferably measured directly, and the longitudinal speed of the vehicle v can be determined, for example, from the signals of revolution sensors. The two transverse accelerations $a_{qv}$, $a_{qh}$ are preferably measured directly by suitably mounted transverse-acceleration sensors.

If appropriate, it is also possible to measure the yaw-angle velocity directly. However, this is not absolutely necessary, since the yaw-angle velocity can also be determined from the measurement quantities, as described elsewhere herein. In the second step 302, the transverse acceleration $a_q$ and the yaw-angle acceleration $d^2\Phi/dt^2$ are determined from these quantities, for example, by means of the equations (12) and (13). Then, in a step 303, the roll angle $\tau$ with its time derivations is determined, for example by means of the equations (14) and (15). The higher derivations of the state quantities, which are also required below, are then formed by means of difference quotients. The lateral forces and their derivations are then obtained in a step 304 by means of the equations (16), (17), (18) and (19). Then, in a step 305, the sideslip angle and the yaw-angle velocity, if this quantity has not already been measured directly, are obtained by means of the equations (20), (21) and (22).

Figure 4:
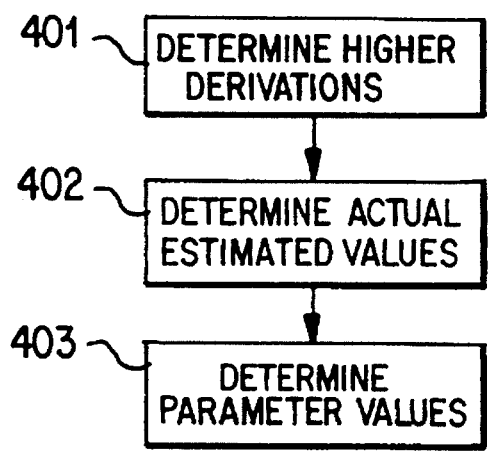
FIG. 4 is a flow chart illustrating a method according to other exemplary embodiments of the invention.

Furthermore, from FIG. 4 shows that an adaptation of the parameters can take place. For this purpose, in a step 401, higher derivations of the lateral forces are first determined by means of difference quotients. Actual estimated values of the parameters are then determined in a step 402 by means of the equations (23), (24), (25) and (26). Then, in a step 403, values of the parameters which, in the calculations which then follow, are used to determine quantities characterizing the driving behavior are determined by means of the equations (27) and (28).

Figure 5:
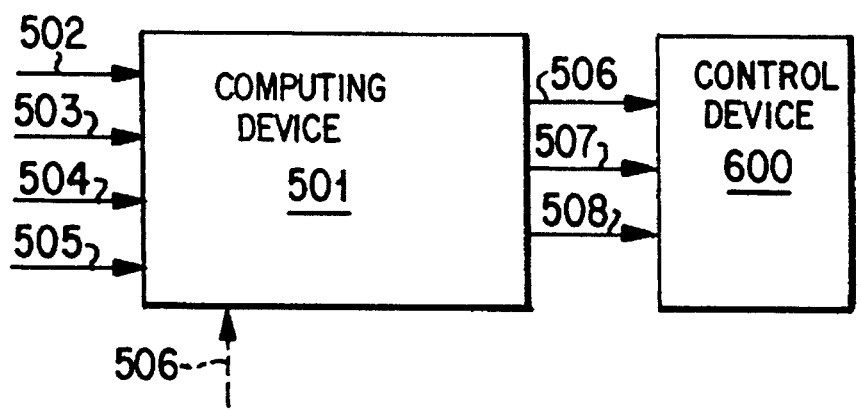
FIG. 5 shows a computing device for receiving measured quantities and for determining various quantities indicative of driving characteristics according to one or more exemplary embodiments of the present invention.

FIG. 5 shows a computing device 501, to which the said quantities are fed, according to the step 301 shown in FIG. 3, as input signals 502, 503, 504, 505 representing the steering angle, the longitudinal speed of the vehicle, and the two transverse accelerations. After the corresponding quantities have been determined in the computing device according to the flow diagram of FIG. 3 by means of the said equations, output signals 506, 507, 508 representing specific quantities are outputted to a vehicle control device 600. These specific quantities can be the sideslip angle, the yaw-angle velocity and/or a further quantity which is determined by the method. Furthermore, an adaptation of the parameters, by means of which the vehicle model is described, takes place according to the flow diagram of FIG. 4. The vehicle control device 600 influences the driving behavior of the vehicle as a function of the yaw-angle velocity. The control device 600 can be any of a number of different types of control devices that can use the yaw-angle velocity in a control of driving behavior. Examples of such control devices 600 are steering angle controls (U.S. Pat. No. 4,690,431); suspension controls (U.S. Pat. No. 5,208,749); and brake and traction control systems, such as shown in U.S. Pat. No. 4,988,593. All of these known controls use a signal representing yaw-angle velocity to control the driving behavior of a vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for determining at least one quantity which characterizes driving behavior, using a computing device which is fed signals representing measured quantities of the steering angle, of the longitudinal speed of a vehicle that has tires and of two transverse accelerations located one behind the other in the longitudinal direction of the vehicle, comprising the steps of:

deriving further quantities using vehicle-specific quantities and a vehicle model;

determining yaw-angle velocity using the measured quantities and the derived further quantities along with the vehicle model, wherein the vehicle model takes into account the transverse force buildup at the tires of the vehicle;

outputting the yaw-angle velocity to a vehicle control device; and influencing driving behavior of the vehicle with the vehicle control device as a function of the yaw-angle velocity.

2. Method according to claim 1, wherein determining the yaw-angle velocity is independent of a particular driving state.

3. Method according to claim 1, further comprising determining and outputting a sideslip angle.

4. Method according to claim 1, wherein rolling movements of the vehicle are factored into determining quantities.

5. Method according to claim 1, wherein the transverse accelerations are measured by transverse-acceleration sensors having respective installation heights which are identical and correspond to a height of a center of gravity.

6. Method according to claim 1, further comprising adapting the vehicle-specific quantities according to vehicle type.

7. Method according to claim 6, wherein adapting of the vehicle-specific quantities is performed by a sliding average method.

8. Method according to claim 1, further comprising outputting at least one of the further quantities.

9. Method according to claim 2, further comprising adapting the vehicle-specific quantities according to vehicle type.

10. Method according to claim 9, wherein adapting of the vehicle-specific quantities is performed by a sliding average method.

11. Method according to claim 3, further comprising adapting the vehicle-specific quantities according to vehicle type.

12. Method according to claim 11, wherein adapting of the vehicle-specific quantities is performed by a sliding average method.

13. Method according to claim 4, further comprising adapting the vehicle-specific quantities according to vehicle type.

14. Method according to claim 13, wherein adapting of the vehicle-specific quantities is performed by a sliding average method.

15. Method according to claim 5, further comprising adapting the vehicle-specific quantities according to vehicle type.

16. Method according to claim 15, wherein adapting of the vehicle-specific quantities is performed by a sliding average method.

17. Method according to claim 2, further comprising outputting at least one of the further quantities.

18. Method according to claim 3, further comprising outputting at least one of the further quantities.

19. Method according to claim 4, further comprising outputting at least one of the further quantities.

20. Method according to claim 5, further comprising outputting at least one of the further quantities.

* * * * *